United States Patent [19]

MacConnell

[11] Patent Number: 5,398,280
[45] Date of Patent: Mar. 14, 1995

[54] PAGING SYSTEM FOR REMOTE COMPUTERS

[75] Inventor: Robert N. MacConnell, Dayton, Ohio

[73] Assignee: Mead Data Central, Inc., Dayton, Ohio

[21] Appl. No.: 829,492

[22] Filed: Feb. 3, 1992

[51] Int. Cl.6 .......................................... H04M 11/00
[52] U.S. Cl. ........................................ 379/93; 379/57; 379/56; 379/102; 379/104; 379/110
[58] Field of Search .................. 379/57, 56, 93, 102, 379/104, 105, 106, 107, 110; 340/825.47, 825.44

[56] References Cited

U.S. PATENT DOCUMENTS

| | | | |
|---|---|---|---|
| 3,811,012 | 5/1974 | Barber | 179/2 A |
| 3,889,062 | 6/1975 | Epstein | 179/2 DP |
| 4,051,326 | 9/1977 | Badagnani et al. | 179/2 DP |
| 4,356,545 | 10/1982 | West | 364/2 W |
| 4,524,244 | 6/1985 | Faggin et al. | 379/96 |
| 4,633,247 | 12/1986 | Hegeler | 340/825.69 |
| 4,647,721 | 3/1987 | Busam et al. | 379/102 |
| 4,713,837 | 12/1987 | Gordon | 379/93 |
| 4,723,269 | 2/1988 | Summerlin | 379/102 |
| 4,758,833 | 7/1988 | Dunkerton et al. | 340/825.44 |
| 4,806,906 | 2/1989 | Oda et al. | 340/311.1 |
| 4,887,077 | 12/1989 | Irby, III et al. | 340/825.47 |
| 4,922,518 | 5/1990 | Gordon et al. | 379/57 |
| 4,959,647 | 9/1990 | Daigle | 340/825.72 |
| 5,001,471 | 3/1991 | Snowden et al. | 340/825.44 |
| 5,043,718 | 8/1991 | Shimura | 340/825.47 |
| 5,045,850 | 9/1991 | Andros et al. | 340/825.47 |
| 5,113,427 | 5/1992 | Ryoichi et al. | 340/825.48 |
| 5,265,272 | 11/1993 | Kurcbart | 340/825.44 |
| 5,276,443 | 1/1994 | Gates et al. | 375/36 |

OTHER PUBLICATIONS

Teletext Remote Control by R. T. Russell; Wireless World, Apr. 1979; pp. 53 thru 56.
PCT/US82/01443, Apr. 1983.

Primary Examiner—Curtis Kuntz
Assistant Examiner—Stella L. Woo
Attorney, Agent, or Firm—Biebel & French

[57] ABSTRACT

A system is disclosed for supplying information in electronic form from a database to subscribers at a plurality of remote locations. Subject matter descriptors are applied to newly acquired information, and these descriptors are compared with information interest profiles maintained for all of the subscribers. Each subscriber also has an assigned identification number. A list of identification numbers is prepared as a result of the interest check, and this list of numbers is broadcast by radio transmission. The subscribers are equipped with radio receivers able to recognize their assigned numbers. When a radio receiver recognizes its identification number, it causes an associated remote computer to call the database and request transmission of the document by telephone link.

5 Claims, 5 Drawing Sheets

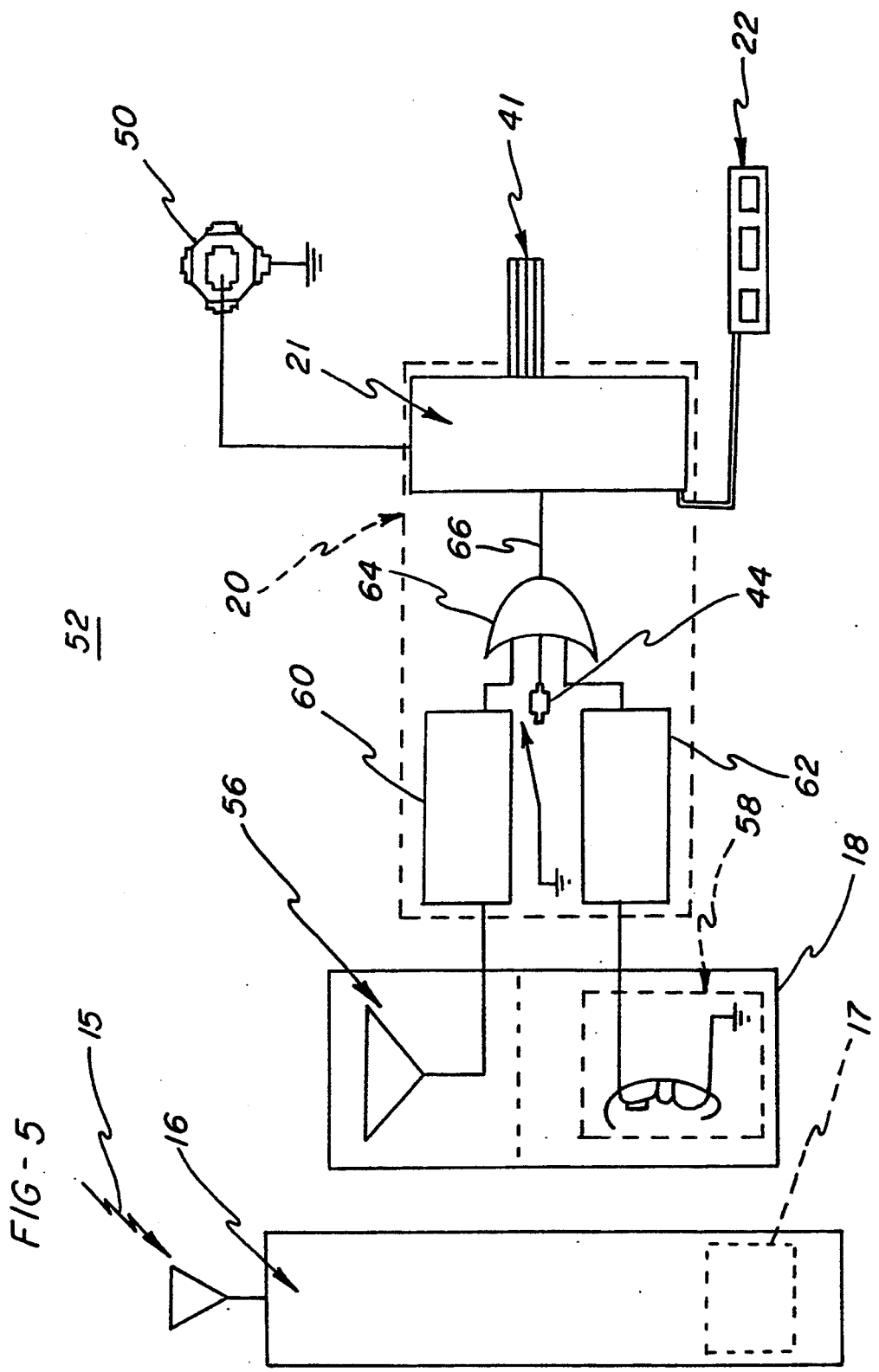

PAGING SYSTEM FOR REMOTE COMPUTERS

BACKGROUND OF THE INVENTION

This invention relates to an apparatus and method for relaying data from a database to a remote computer. More particularly, the invention relates to a system which is able to identify a specific remote computer for which predetermined data is available, and thereafter cause the data to be communicated from the database to that computer. Such systems typically employ a host computer at the database for managing the collection of information of varying interest to locations served by the different remote computers. In order to perform this function the host computer must assign subject matter descriptors to each newly collected file of information and identify the interested subscribers by comparing the assigned descriptors against interest profiles for each of the remote locations. Then the host computer must cause the opening of communication links with remote computers serving the identified subscribers and control the transmission of the information over those links.

An example of an application in which the present invention finds utility is an electronic subscription service which collects vast amounts of newly generated information for dissemination to a large number of subscribers. Heretofore such services have been available primarily only to remote systems of a dedicated type. Typically the subscriber has leased a specially configured electronic storage device equipped with a suitable modem for telephone communications with the host computer. When the host computer has concluded that newly received data fits the interest profile of a particular remote location, it has simply called the dedicated system at that location, established a telephone link and transmitted the data. For its part the local system has simply answered the call from the host, received the information and printed it, either contemporaneously or off line. While such a system effectively relays the desired information, the requirement for dedicated local hardware leads to inefficiencies in cost. The only available alternative has been an electronic mailbox or bulletin board arrangement wherein the remote computer has made periodic calls to the host to check on the contents of its "box".

The mailbox arrangement works reasonably well for persons who are regular users of computers, but it does not meet the requirements of a business person who has a need to monitor information of a specific type. For instance, a particular subscriber may want all reports regarding the business operations of a specific competitor and all reports of business acquisitions within a given industry. This could generate several reports a day for that one subscriber, and any particular report could be of overlapping interest to a number of other subscribers. A service of this type requires a huge database and encounters a variety of complex problems in targeting and delivering its reports. An example of such a service is one offered by Mead Data Central, Inc. under its service mark ECLIPS.

The recent wide proliferation of personal computers has greatly expanded the potential market for electronic subscription services. But the problems inherent host-initiated communications have discouraged market development. A call which is initiated by a host computer cannot be received unless the remote computer is turned on, is fully operational and is not otherwise engaged. Owners of personal computers are disposed to change their hardware, software or telephone numbers thereby thwarting incoming calls. Furthermore, a personal computer which can be reached by an electronic subscription service is vulnerable to calls from unauthorized sources. The resulting security problem has remained a serious obstacle to the marketing of electronic subscription services.

SUMMARY OF THE INVENTION

The present invention provides an improved apparatus and method for communicating a message from a host computer to a predetermined remote computer. The communication is host-initiated by a radio link which broadcasts a code identifying the remote computer for which the message is available. A radio receiver at the remote station receives the code and responds by activating its associated computer. The local computer then places a telephone call to the host and receives the message in the conventional manner. The code which is broadcast by the host system may comprise a unique address for a specific remote computer or may simply identify the type of information which is available for transmission. In an alternative embodiment the host system transmits an identifying address (which may be a simple telephone number) of the remote computer by telephone link to a commercial paging service. That service in turn broadcasts the address or another equivalent address to the radio receiver at the remote station. As stated above, the local computer then places a telephone call to the host.

In a preferred embodiment of the invention the remote computer is provided with a terminate and stay resident program for establishing a communication link with the host. In this embodiment the radio receiver simply generates an interrupt for the computer. The computer periodically checks for this interrupt and executes the communication program upon detection thereof.

The software for the remote computer preferably includes a batch file which initializes the communication program at startup. An indicator light may be provided for giving a visual indication of the arrival of an interrupt during a period of time that the remote computer is unpowered. The communication program checks the interrupt status at the time of power-up and calls the host immediately in the event that an interrupt has occurred. In an alternative embodiment the remote computer is equipped with an automatic switch which applies power whenever an interrupt signal arrives during an unpowered state.

It is therefore an object of the invention to provide improved, host-initiated communications between a database and a predetermined remote computer.

It is another object of the invention to provide an improved apparatus and method for customer servicing by an electronic subscription service.

Another object of the invention is to provide an apparatus and method for signalling a computer that another computer has information to be transmitted.

Yet another object of the invention to provide improved security for a data receiving computer.

Other objects and advantages of the invention will be apparent from the following description, the accompanying drawings and the appended claims.

BRIEF DESCRIPTION OF THE DRAWINGS

FIG. 5 is a block diagram of a remote receiver.

DETAILED DESCRIPTION OF THE PREFERRED EMBODIMENT

Figure 1:
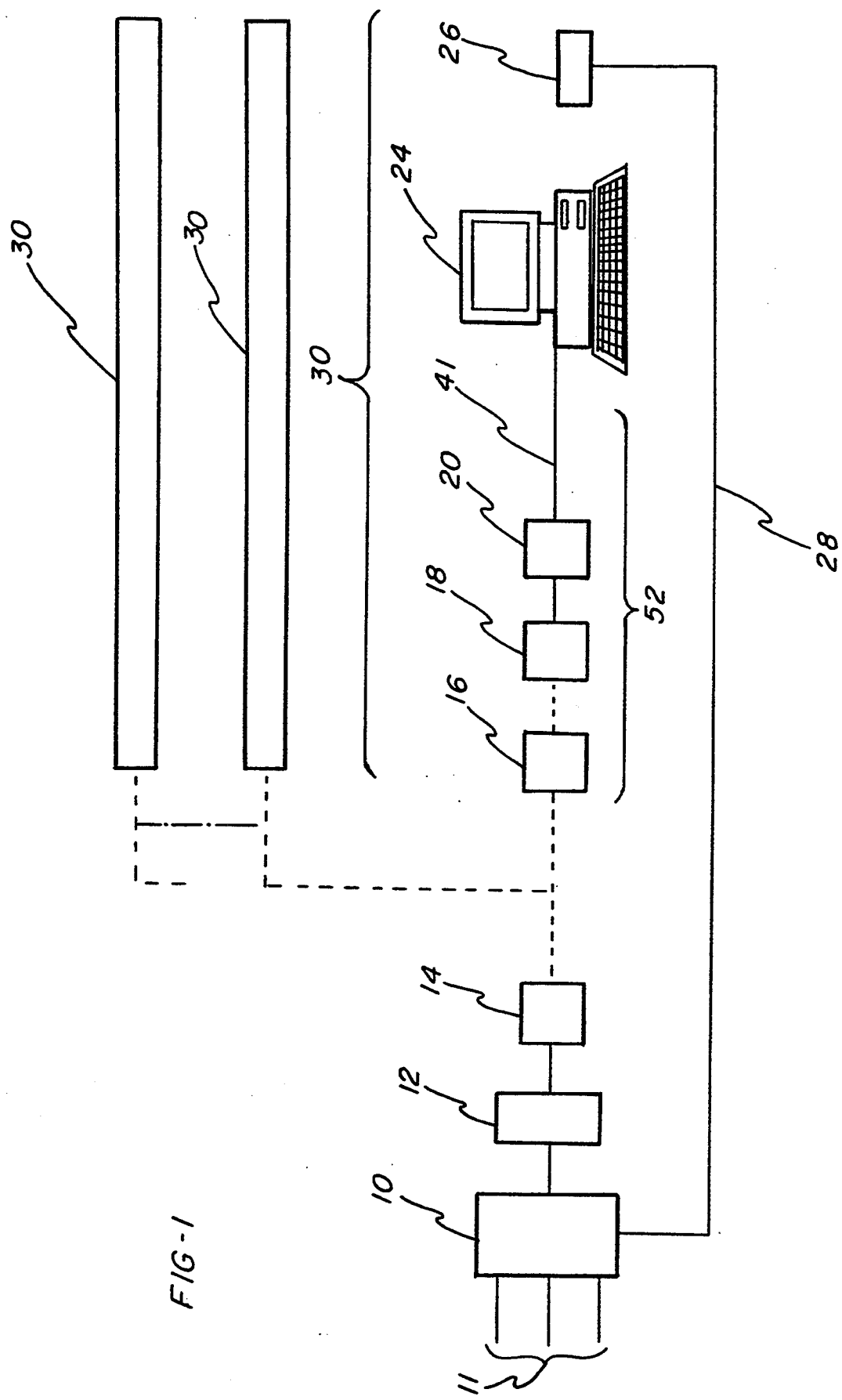
FIG. 1 is a block diagram of the paging system of the invention.

Initially referring to FIG. 1, there is shown a block diagram of apparatus which carries out communications between a database 10 and a series of a remote sites 30. Database 10 receives new data files from a plurality of sources 11. Each new data file is assigned a series of subject matter descriptors by a host computer 12. Computer 12 also maintains an interest profile for each remote site 30. After the subject matter descriptions have been assigned to a new data file, those descriptions are compared against the stored interest profiles for all of sites 30. It is to be understood that database 10 may maintain interest profiles for thousands of remote sites and that only three such sites are shown for ease of illustration. Any given check of a new database entry might produce any number of "hits" depending upon the specific interest profiles being checked. In the preferred embodiment as hereinafter described, a separate coded message is broadcast for each remote site 30 having a predetermined interest in the new entry.

Once the database 10 determines that a particular remote site 30 is interested in a file containing newly acquired information, it generates an address identifying that site and activates a transmitter 14 to broadcast that address for reception by all sites 30. While all remote sites 30 receive the coded message, only one site will recognize the address. In a specific application of the invention the sites 30 may be subscribers to an electronic publication service operated under control of database 10. Remote site 30 has an interface unit 52 which includes a radio receiver 16, a sensing circuit 18, and a controller 20. Site 30 also has a computer 24 and a modem 26. Receiver 16, preferably a pager, has a decoder 17 (FIG. 4) of conventional design which processes all received addresses and compares them against its own preprogrammed address. When an address is recognized the decoder activates pager 16 thereby generating electromagnetic radiation and a magnetic field which are sensed by a sensing unit 18. Sensing circuit 18 then produces a sensing signal to indicate that pager 16 has been activated. This sensing signal is sent to the controller 20 which in turn controls the operation of computer 24 through line 41. Controller 20 also activates an indicator 22 (FIG. 4) which gives a visual indication of the status of receiver 16 and the responsive condition of computer 24. Pager 16 may include a timing circuit for automatic deactivation after the short time period required for the operation of sensing unit 18.

Remote computer 24 responds to control signals from controller 20 by activating modem 26 and establishing a telephone link with database 10 across a telephone line 28. Once this link is achieved, the newly available data is downloaded from host computer 12 to remote computer 24. Computer 24 then stores the data on a disk or in RAM for such use as may be desired. Alternatively, computer 24 may route the data directly to a printer. In the latter case the computer may display an eye-catching indicator on its screen to inform the user to look for the printout.

Figure 2:
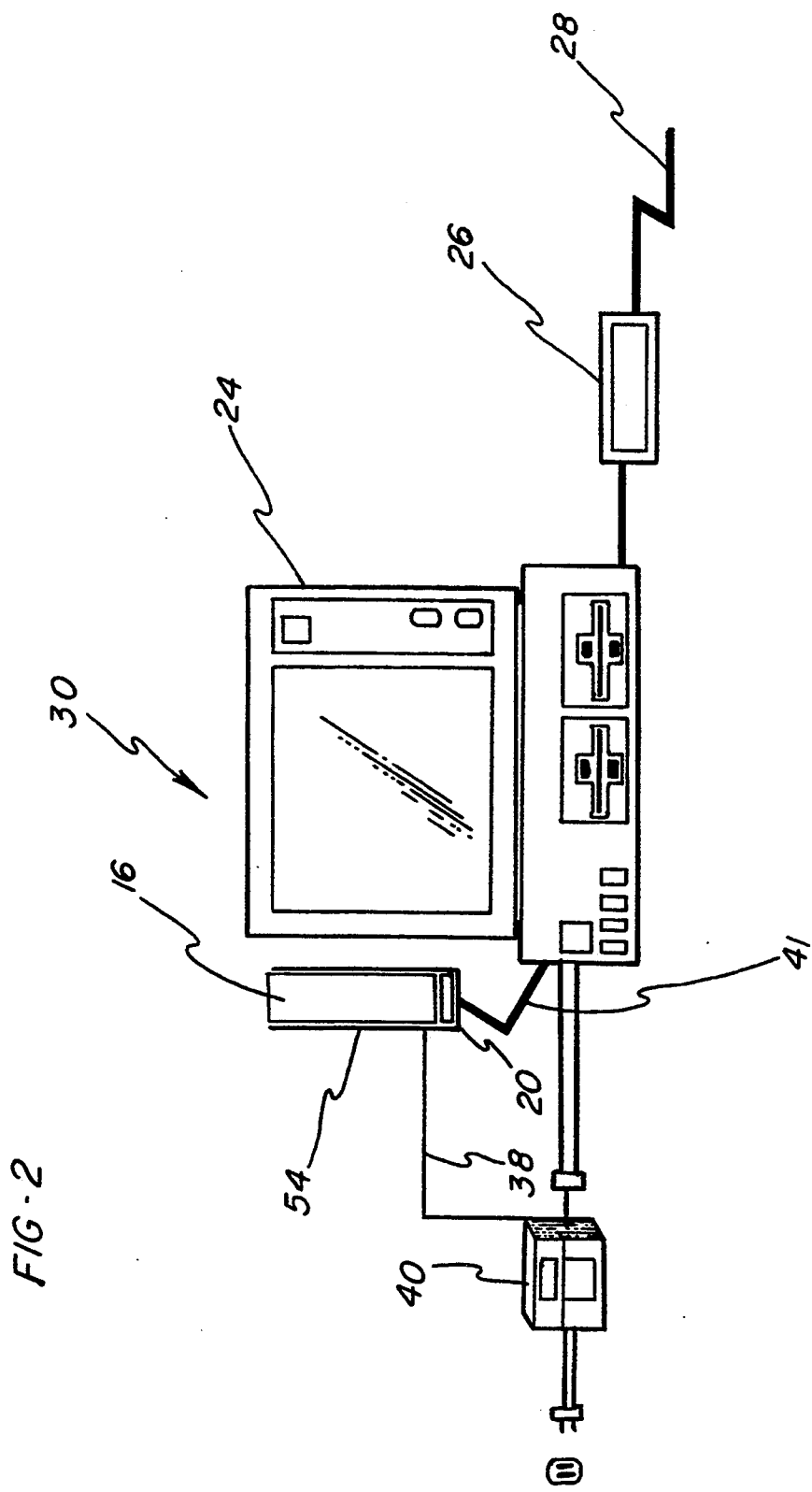
FIG. 2 is a schematic illustration of equipment at a receiving station.
Figure 3:
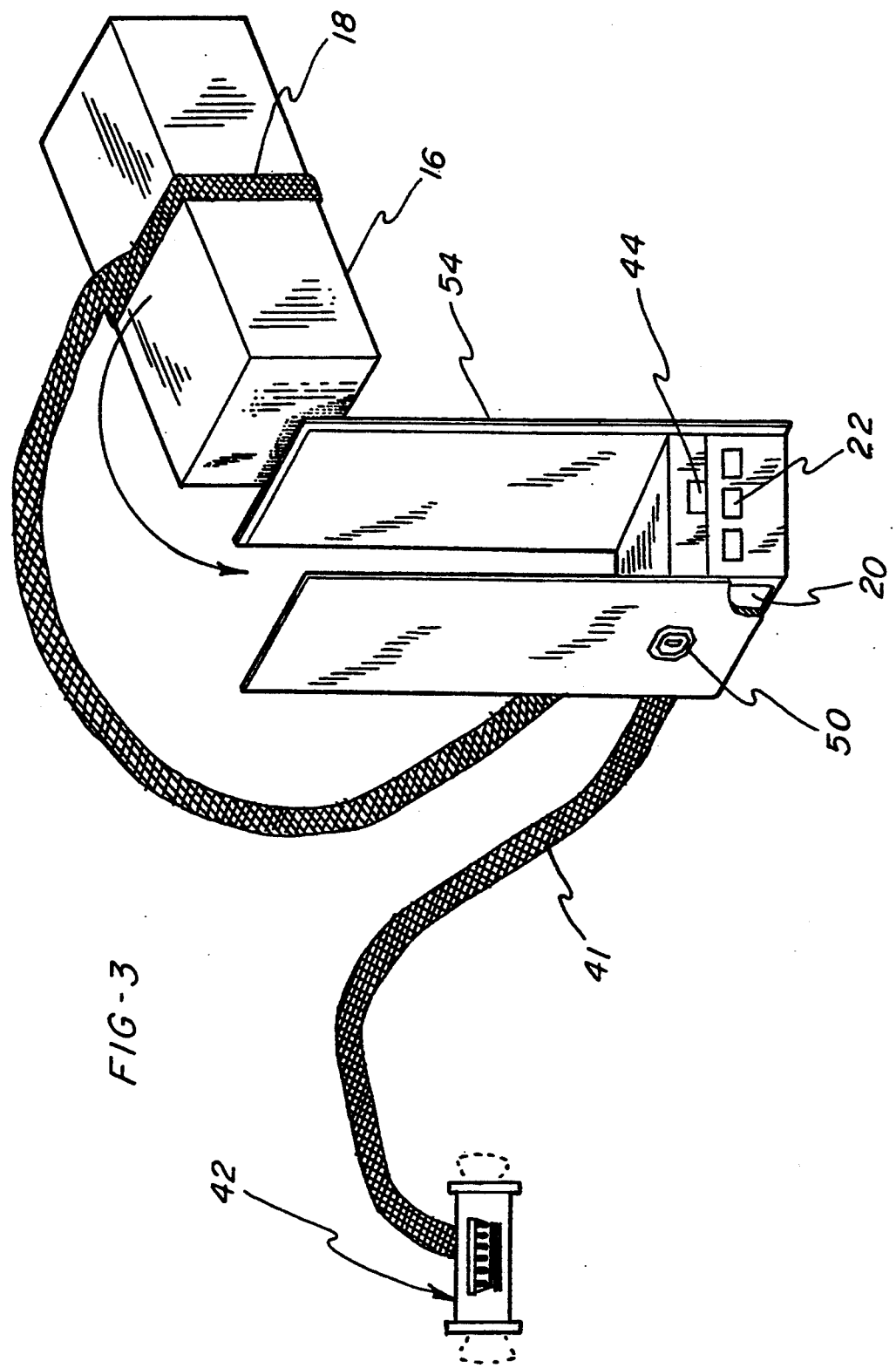
FIG. 3 is an enlarged illustration of an interface unit.

Now referring to FIG. 2, there is shown the remote site 30. Controller 20 is built into the base of a holder or holster 54 which in turn is mounted on or near computer 24. Holster 54 is provided with a recess for removably receiving the remote receiver 16. Holster 54 may be provided with an optional charging unit (not illustrated) for maintaining a charge on the batteries (also not illustrated) of receiver 16. Holster 54 is in communication with an optional switch unit 40. The details of holster 54 are illustrated in FIG. 3.

Controller 20 produces control signals for an indicator panel 22 which is mounted on holster 54 for indicating the reception of messages from host computer 12. Upon sensing the receipt of such messages controller 20 also generates an interrupt signal for computer 24. The interrupt signal preferably is fed from controller 20 to computer 24 via line 41. Line 41 is coupled to a connector 42 (FIG. 3) adapted for plugging into an available parallel port or dedicated serial port (not illustrated) on the computer 24. Connector 42 may be a dual in-line device, so that the parallel port may be shared with a printer or other peripheral device. Therefore, the invention presents no interference with the normal operations of the computer 24.

This invention may employ a computer 24 equipped with a communication control program of the TSR (terminate and stay resident) type. Such a program is loaded into memory when the computer is booted and stays there in an inactive state while the computer 24 performs other tasks. Generally only a program kernel is loaded into memory. When the kernel is activated it interrupts the program then in progress and transfers it into inactive memory with all operating parameters saved. Then the kernel calls up a utility program (in this case a communication package) from a designated disk drive and begins a temporary substitute task. Such TSR programs are well known and need not be described in detail. One such program is available commercially under the trademark SIDE KICK.

After the communications kernel has been stored in RAM, computer 24 performs other routine tasks and periodically checks for a hardware interrupt at connector 42. In particular it looks for a state change on a predetermined connector pin. If the computer is an IBM personal computer equipped with a printer and a shared parallel interface, then controller 20 may react to a radio message by putting a high signal on a shared pin such as pin 11 of connector 42. This produces an interrupt which tells computer 24 that the printer is busy. As a consequence the computer temporarily suspends any transmission of data to the printer. This frees the parallel port for use by controller 20.

Controller 20 senses the availability of the parallel port by checking for strobing activity on pin 1. When all strobing activity has stopped, controller 20 places a coded series of pulses on pin 32, the NOT ERROR pin, which the computer interprets as an indication that a paging signal has been received. The computer reacts by placing an acknowledgement signal on pin 31. The acknowledgement signal preferably may be a pulse having a width which will not be recognized by the printer. Upon receipt of the acknowledgement signal, controller 20 lowers the busy signal on pin 20.

The communication utility remains on disk (or in dormant RAM) until computer 24 recognizes a paging code on pin 32 of connector 42. When the paging code is detected, the active program is interrupted, and the communication utility is called up to perform its task. That task includes activating modem 26, dialing database 10, requesting transmission of the available data, and storing or printing the data when received. Computer 24 then returns to normal activity.

Figure 4:
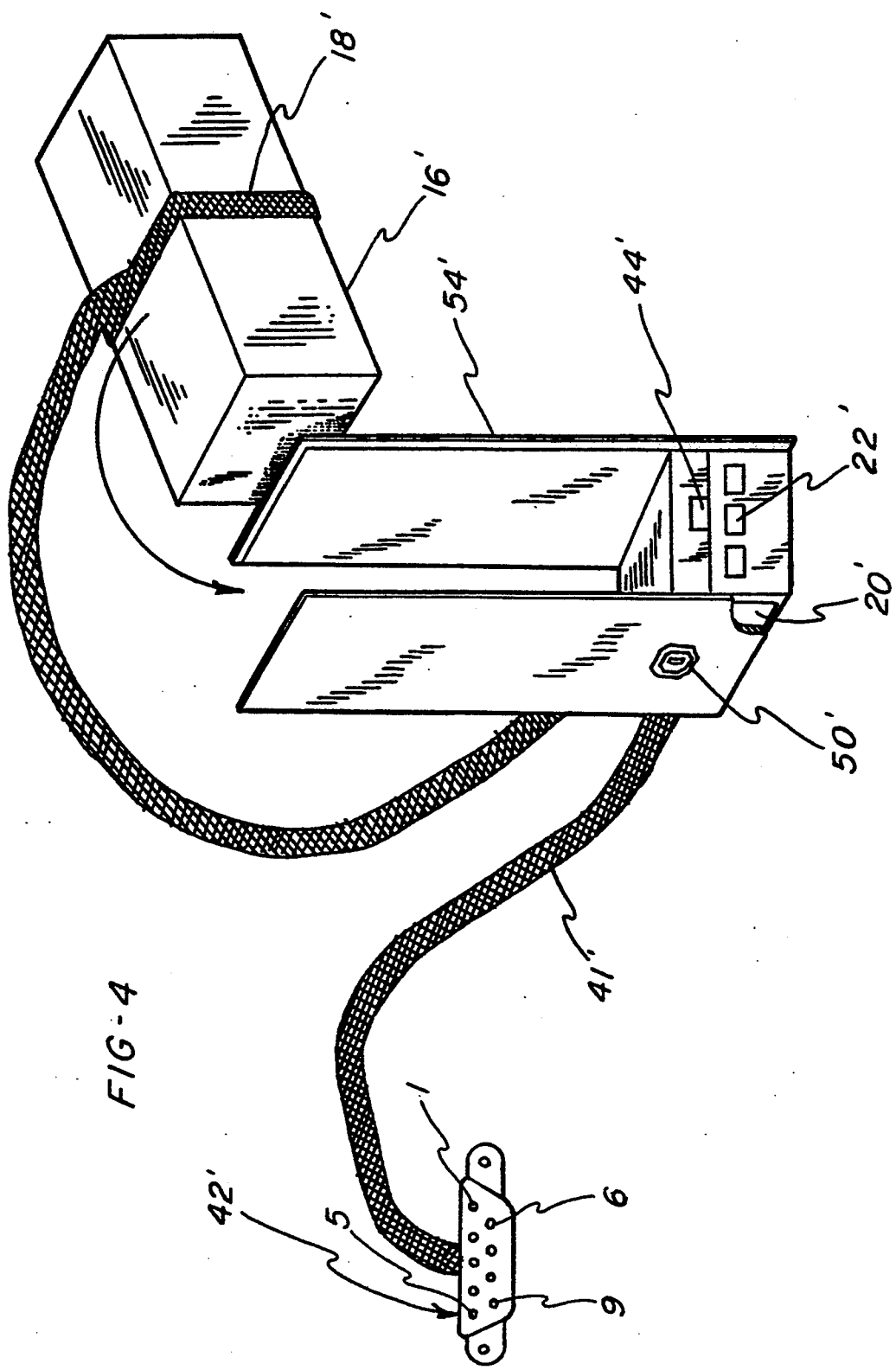
FIG. 4 is an alternative embodiment of the interface unit.

In an alternative embodiment of the invention, computer 24 has a dedicated serial port 42' as shown in FIG. 4. A sensing unit 18' detects the activation of a receiver 16' and triggers a controller 20. The controller then puts a high signal on pin 6 of the serial port 42', and computer 24 acknowledges that signal with a high return on pin 4. The computer then activates the TSR software to initiate a communication link with database 10. The data is transferred, and the computer again returns to normal operation.

As an option, the present invention may use power switching device 40 to activate computer 24 from a power down state. In that configuration controller 20 checks the status of switch 40 via line 38 whenever sensing unit 18 is activated. If switch 40 is OFF, then a solenoid relay is activated to turn it ON. At this point computer 24 executes a batch file, boots itself up and activates the communication link with the database 10. In the absence of switch 40 the controller activates indicator 22 and places a continuous signal on the dedicated pin of connector 42. Then upon the next power-up sequence computer 24 immediately calls up the communication utility and contacts database 10 for the awaiting information.

In an alternative embodiment the communications software may be provided with a routine to check the priority of various application programs available to the site. In that embodiment the communications program interrupts only lower priority applications. When higher priority applications are running, the link with database 10 is postponed and a "WAIT" state is signalled by indicator 22. The communication program is run only after other higher priority programs have completed their tasks.

Now referring to FIG. 3, there is shown an enlarged illustration of pager 16 removed from holster 54 and disconnected from sensing unit 18. In the preferred embodiment sensing unit 18 comprises bands of hook and loop fastening material containing magnetic and electromagnetic sensing circuits. Thus sensing unit 18 is easily slipped around pager 16 at a location where maximum strength signals may be received. Pager 16 is placed into holster 54 with the sensing band wrapped therearound.

Indicator 22 provides a "DATA READY" indication when new information is available from the database 10. If the remote station is not equipped with a switch unit 40, then the "DATA READY" indication also serves as a notice that computer 24 should be switched on to initiate a telephone link with database 10. A test switch 44 is provided for testing the controller 20 which activates the controller 20 causing the computer 24 to call the database 10. A jack 50 may be provided for connection to optional switching unit 40.

Now referring to FIG. 5, there is shown a schematic block diagram of interface unit 52. When pager 16 is activated by a radio signal 15, the active condition thereof is sensed by an electromagnetic radiation sensor 56 and a magnetic field sensor 58, both incorporated into sensing band 18. Sensor 56 produces a sensing signal which is applied to an amplifier 60 of the controller 20. The sensing signal is then amplified and input into a comparator 64. Magnetic field sensor 58 produces a sensing signal which is input into an amplifier 62 of the controller 20. The amplifier 62 amplifies the sensing signal and inputs it into comparator 64. A test signal may also be applied to comparator 64 by closing test switch 44.

Comparator 64 is preferably an OR gate so that a signal received from amplifier 60, test switch 44 or amplifier 62 will produce a driving signal on line 66 for driver 21. When driver 21 is activated by a driving signal on line 66 it produces a status signal to the printer in-line connector 42 via line 41 and also a control signal to power jack 50. Driver 21 additionally provides indication control signals for indicator 22.

It will be appreciated that the invention may be practiced in a multi-tasking environment without using the terminate and stay resident program which is described above. In such an embodiment of the invention there would be no need for the remote computer to interrupt any application program in order to open a communication link with the host.

While the methods herein described, and the forms of apparatus for carrying this method into effect, constitute a preferred embodiment of this invention, it is to be understood that the invention is not limited to this precise method and form of apparatus, and that changes may be made in either without departing from the scope of the invention, which is defined in the appended claims.

What is claimed is:

1. Apparatus for receiving data from a host computer comprising:

a radio receiver for receiving a radio signal indicating the availability of data for a specific remote location;

decoding means for decoding said radio signal to establish an identification of the remote location for which said data is available;

control means responsive to said decoding means for generating an interrupt signal;

a connector provided with a plurality of data transmission pins;

dual in-line connection means connected for receiving said interrupt signal and applying said interrupt signal to a predetermined one of said data transmission pins;

a computer having a parallel port connected to said connector and responsive to the presence of said interrupt signal on said predetermined one of said transmission pins by temporarily suspending a program then in operation and generating a code corresponding to a telephone number for said host computer;

a modem for dialing said number, receiving said data from said host computer and relaying said data to said computer; and switching means responsive to said control means for switching power to said computer, so that said computer is able to respond to said interrupt signal.

2. Apparatus according to claim 1 wherein said decoding means comprises radiation generating means activated by successful decoding of said radio signal, and said control means comprises radiation sensing means responsive to radiation emitted by said radiation generating means.

3. Apparatus according to claim 2 wherein said radio receiver and said decoding means are incorporated into a hand-held unit, said sensing means comprising fastening means for mounting on said unit; said radiation sensing means being incorporated into said fastening means.

4. Apparatus according to claim 3 wherein said radiation generating means comprises means for generating a magnetic field and means for generating electromagnetic energy; said radiation sensing means comprising means for sensing a magnetic field and means for sensing electromagnetic radiation.

5. Apparatus for receiving data from a host computer comprising:
   a hand-held unit including a radio receiver for receiving a radio signal indicating the availability of data for a specific remote location and decoding means for generating a magnetic field in response to the occurrence of a predetermined code in said radio signal;
   control means comprising a holster for removably seating said hand-held unit, a sensing band secured around said hand-held unit and attached to said holster, and means responsive to said magnetic field for generating a recognition signal;
   a computer responsive to said recognition signal for generating a code corresponding to a telephone number for said host computer;
   a modem for dialing said number, receiving said data from said host computer and relaying said data to said computer,
   switching means responsive to said control means for switching power to said computer, so that said computer is able to respond to said recognition signal; and
   dual in-line connection means having an output connector provided with a plurality of connection pins and two input connections interconnected for shared access to said connection pins; said dual in-line connection means being connected for receiving said recognition signal on one of said input connections and delivering said recognition signal to a predetermined one of said connection pins; said computer being connected for receiving said recognition signal from said predetermined one of said connection pins.

* * * * *